US007120921B1

(12) United States Patent
Ito

(10) Patent No.: US 7,120,921 B1
(45) Date of Patent: Oct. 10, 2006

(54) SYSTEM AND METHOD OF PROVIDING BROADCASTING INFORMATIONS

(75) Inventor: Noriko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 1060 days.

(21) Appl. No.: 09/697,503

(22) Filed: Oct. 27, 2000

(30) Foreign Application Priority Data

Oct. 28, 1999 (JP) ................................ 11-307482

(51) Int. Cl.
*H04N 7/10* (2006.01)
*H04N 7/25* (2006.01)

(52) U.S. Cl. .......................... 725/32; 725/75; 725/134; 725/142

(58) Field of Classification Search .................. 725/75, 725/76, 82, 85, 36, 60, 61, 42, 134, 142, 725/74; 705/14; 386/35, 46, 40, 108; 342/457, 342/458; 324/207.26, 226; 434/307 R; 340/989; 701/300
See application file for complete search history.

(56) References Cited

U.S. PATENT DOCUMENTS

| | | | | |
|---|---|---|---|---|
| 5,113,427 | A | 5/1992 | Ryoichi et al. | 379/57 |
| 5,396,624 | A * | 3/1995 | Campbell, Jr. | 705/44 |
| 5,500,638 | A | 3/1996 | George | 340/468 |
| 5,629,693 | A | 5/1997 | Janky | 340/988 |
| 5,631,631 | A | 5/1997 | Deschenes | 340/572 |
| 5,708,478 | A * | 1/1998 | Tognazzini | 348/552 |
| 5,732,216 | A * | 3/1998 | Logan et al. | 709/203 |
| 5,787,174 | A | 7/1998 | Tuttle | 380/23 |
| 5,798,714 | A | 8/1998 | Nyfelt | 340/988 |
| 5,831,519 | A | 11/1998 | Pedersen et al. | 340/425.5 |
| 5,891,043 | A | 4/1999 | Ericksen et al. | 600/508 |
| 5,917,405 | A | 6/1999 | Joao | 340/426 |
| 5,926,086 | A | 7/1999 | Escareno et al. | 340/426 |
| 5,929,752 | A | 7/1999 | Janky et al. | 340/426 |
| 5,963,129 | A | 10/1999 | Warner | 340/468 |
| 6,067,008 | A * | 5/2000 | Smith | 340/438 |
| 6,282,713 | B1 * | 8/2001 | Kitsukawa et al. | 725/36 |
| 6,598,228 | B1 * | 7/2003 | Hejna, Jr. | 725/91 |
| 2001/0033442 | A1 * | 10/2001 | Rines et al. | 360/1 |

FOREIGN PATENT DOCUMENTS

| | | |
|---|---|---|
| EP | 0817414 A2 * | 1/1998 |
| JP | 8-508617 | 9/1996 |
| JP | 9-214875 | 8/1997 |
| JP | A 10-79711 | 3/1998 |
| JP | 10-111894 | 4/1998 |
| JP | A 11-55636 | 2/1999 |
| WO | 94/11989 | 5/1994 |
| WO | WO 96/11436 | 4/1996 |
| WO | WO98/43104 | 10/1998 |
| WO | WO99/22353 | 5/1999 |

* cited by examiner

*Primary Examiner*—Ngoc Vu

(57) ABSTRACT

The present invention provides a system of providing broadcast informations, comprising: a receiving processing unit for receiving both program and advertisement informations broadcasted and for extracting only the advertisement information therefrom; a reproducing unit being connected to the receiving processing unit for fetching both the program and advertisement informations from the receiving processing unit and for re-producing both the program and advertisement informations; an accumulating unit being connected to the receiving processing unit for fetching only the extracted advertisement information from the receiving processing unit and for accumulating the advertisement information; and a control unit being operable by an operator and being connected to both the accumulating unit and the reproducing unit for fetching at least operator-selected one of the accumulated advertisement informations from the accumulating unit and for transferring the at least operator-selected advertisement information to the reproducing unit for enabling the reproducing unit to re-produce the at least operator-selected advertisement information.

24 Claims, 8 Drawing Sheets

SYSTEM AND METHOD OF PROVIDING BROADCASTING INFORMATIONS

BACKGROUND OF THE INVENTION

The present invention relates to system and method of providing broadcasting informations, and more particularly to system and method of providing broadcasting informations, for accumulating and reproducing advertisement informations of such multi-channel digital satellite broadcasting as received by a radio receiver loaded on a vehicle.

The advertisement information of the advertiser or sponsor such as enterprise are broadcasted between broadcasting programs in the television broadcasting and the radio broadcasting. Audiences such as television viewers and radio listeners view and/or listen not only the programs but also the advertisement information. The advertisement information is recorded on a video recorder and/or a tape recorder for subsequent broadcasting the advertisement information. In case of programs of multi-channel digital satellite broadcasting, the programs are selectively recorded in digital data formats on the basis of identification codes which identify the contents of the programs.

It was proposed that the audiences select desired advertisement information from various advertisement broadcastings and accumulate the selected ones to form data base. This conventional technique is disclosed in, for example, Japanese laid-open patent publication No. 9-214875 entitled "television receiver and radio receiver". There was also proposed a computer system such that after the broadcast of the advertisement information has been made via the radio or television broadcasting, then the audiences operate the computer system to display the advertisement information on the display screen and/or to print-out the same. This other conventional technique is disclosed in, for example, Japanese laid-open patent publication No. 10-111894 entitled "computer system allowing radio-listener or television-viewer to obtain the advertisement information".

If the above conventional techniques are applied to the radio receivers loaded on the vehicle, the driver does not usually desire to record all of the advertisement informations in driving and listen the advertisement informations not in driving. The driver usually concentrates to drive the vehicle and pays no attention to the advertisement informations. It is difficult for the driver on driving the vehicle to surely hear or catch the advertisement informations such as product informations and telephone numbers for contact in which the driver might feel interested. This difficulty may be solved by recording the advertisement informations. It is necessary to operate the recorder at the same time when the advertisement informations are broadcasted. Actually, however, the time for broadcasting the advertisement informations are short, and it is difficult to operate the recorder at the same time when the advertisement informations are broadcasted.

Meanwhile, the advertisers such as sponsors desire to repeat the broadcasts of the advertisement informations to enable the audiences to pad the attention to the broadcast and recognize the contents of the advertisement informations. On the other hand, the audiences or the drivers desire to listen again the already broadcasted interesting advertisement informations such as the product informations and telephone numbers for contact in order to surely recognize the contents of the advertisement informations.

It is difficult for the driver audience or listener to pay the attention to the real-time broadcasts of the advertisement informations and surely to recognize the contents of the advertisement informations when driving the vehicle. The advertiser or the sponsor is unlikely to have great deal of expectation in the effect of advertisement.

In the above circumstances, it had been required to develop a novel system and method of providing broadcast informations free from the above problem.

SUMMARY OF THE INVENTION

Accordingly, it is an object of the present invention to provide a novel system of providing broadcast informations free from the above problems.

It is a further object of the present invention to provide a novel system of providing broadcast informations capable of recording broadcasted advertisement informations and reproducing the same repeatedly.

It is a still further object of the present invention to provide a novel system of providing broadcast informations allowing vehicle-drivers to record broadcasted advertisement informations and reproduce the same repeatedly anytime so that the vehicle-drivers surely recognize the contents of the advertisement informations in which they feel interested, and the advertisers or the sponsors may have great deal of expectation in the effect of advertisement.

It is yet a further object of the present invention to provide a novel method of providing broadcast informations free from the above problems.

It is further more object of the present invention to provide a novel method of providing broadcast informations capable of recording broadcasted advertisement informations and reproducing the same repeatedly.

It is moreover object of the present invention to provide a novel method of providing broadcast informations allowing vehicle-drivers to record broadcasted advertisement informations and reproduce the same repeatedly anytime so that the vehicle-drivers surely recognize the contents of the advertisement informations in which they feel interested, and the advertisers or the sponsors may have great deal of expectation in the effect of advertisement.

The present invention provides a system of providing broadcast informations, comprising: a receiving processing unit for receiving both program and advertisement informations broadcasted and for extracting only the advertisement information therefrom; a reproducing unit being connected to the receiving processing unit for fetching both the program and advertisement informations from the receiving processing unit and for re-producing both the program and advertisement informations; an accumulating unit being connected to the receiving processing unit for fetching only the extracted advertisement information from the receiving processing unit and for accumulating the advertisement information; and a control unit being operable by an operator and being connected to both the accumulating unit and the reproducing unit for fetching at least operator-selected one of the accumulated advertisement informations from the accumulating unit and for transferring the at least operator-selected advertisement information to the reproducing unit for enabling the reproducing unit to re-produce the at least operator-selected advertisement information.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
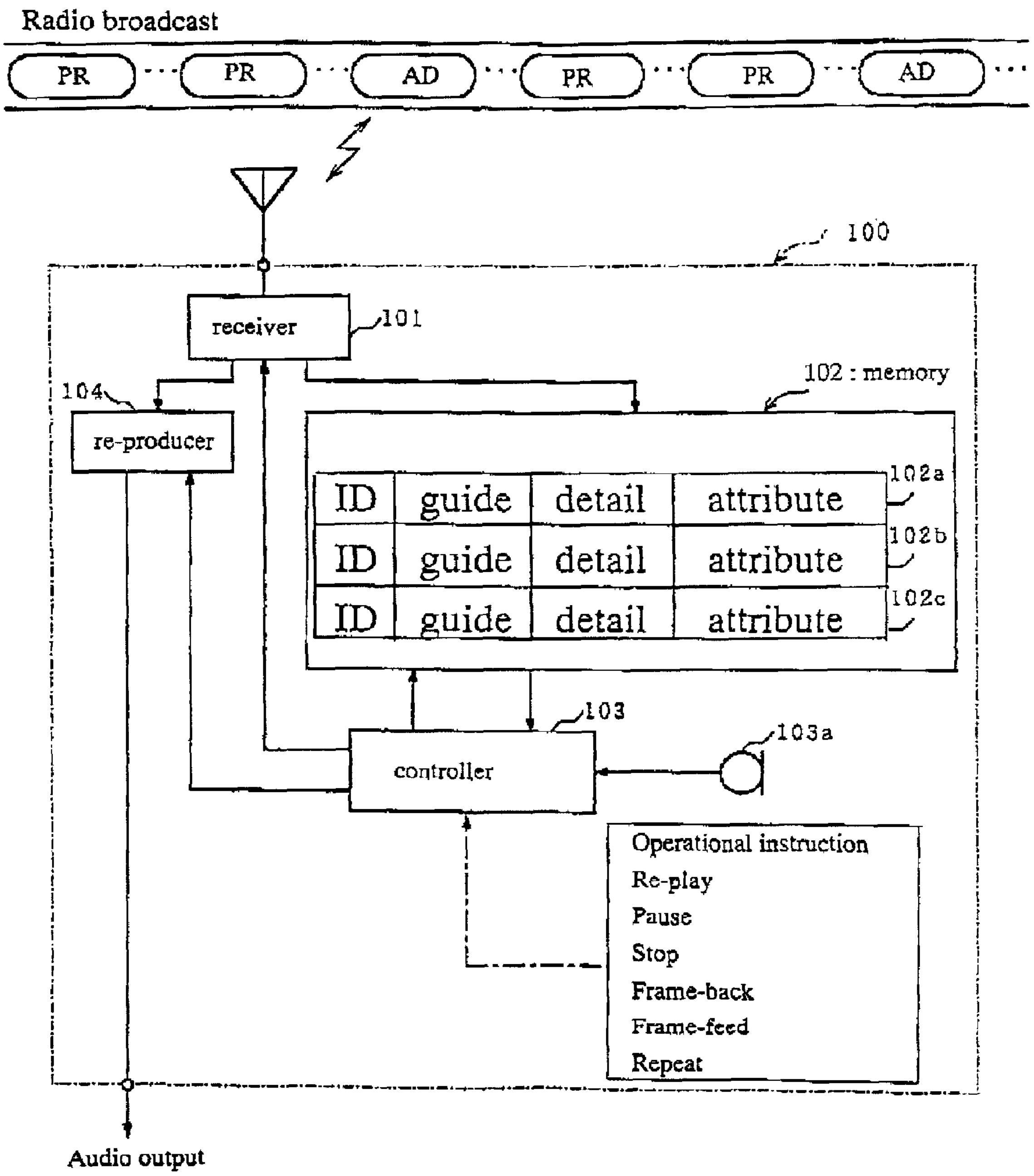
FIG. 1 is a block diagram illustrative of a novel system for providing broadcasting informations in a first embodiment in accordance with the present invention.

The present invention provides a system of providing broadcast informations, comprising: a receiving processing unit for receiving both program and advertisement informations broadcasted and for extracting only the advertisement information therefrom; a reproducing unit being connected to the receiving processing unit for fetching both the program and advertisement informations from the receiving processing unit and for re-producing both the program and advertisement informations; an accumulating unit being connected to the receiving processing unit for fetching only the extracted advertisement information from the receiving processing unit and for accumulating the advertisement information; and a control unit being operable by an operator and being connected to both the accumulating unit and the reproducing unit for fetching at least operator-selected one of the accumulated advertisement informations from the accumulating unit and for transferring the at least operator-selected advertisement information to the reproducing unit for enabling the reproducing unit to re-produce the at least operator-selected advertisement information.

It is preferable that the control unit controls the reproducing unit to discontinue a current re-producing of both the program and advertisement informations and in place re-produce the at least operator-selected advertisement information upon receipt of an interruption instruction of the operator.

It is also preferable that the receiving processing unit recognizes an identification code allocated to the advertisement information for extracting only the advertisement information from the program and advertisement informations broadcasted. It is further preferable that the program and advertisement informations are broadcasted via either radio-broadcasting or television-broadcasting.

It is also preferable that the receiving processing unit recognizes a predetermined frequency signal allocated to the advertisement information for extracting only the advertisement information from the program and advertisement informations broadcasted. In this case, it is further preferable that the program and advertisement informations are broadcasted via either radio-broadcasting or television-broadcasting.

It is also preferable that the control unit fetches the at least operator-selected one of the accumulated advertisement informations in accordance with a predetermined description of attribute for re-producing the advertisement information. In this case, it is preferable that the predetermined description of attribute is a first type attribute to re-produce the advertisement information always belonging to broadcasts of a predetermined broadcast program. The advertisement information may be re-produced repeatedly in accordance with the first type attribute.

Alternatively, the predetermined description of attribute may be a second type attribute to re-produce the advertisement information at a predetermined normal speed until the last of the advertisement information once. In this case, the advertisement information may be re-produced repeatedly in accordance with the second type attribute.

It is also preferable that the reproducing unit comprises at least one of a voice output unit, a display unit and a printing unit.

It is also possible that the receiving processing unit may distinguish the extracted advertisement information into both a guidance information which corresponds to an initial part of the extracted advertisement information and a full information which corresponds to an entire of the extracted advertisement information, and the accumulating unit may accumulate the guidance information and the full information separately, and the control unit may transfer the guidance information to the re-producing unit to re-produce the guidance information to wait for an operator's request for re-producing the full information, before the control unit transfers the full information to the re-producing unit to re-produce the full information only when receipt of the operator's request.

It is also preferable that the control unit controls the re-producing unit to re-produce the advertisement information at a normal speed, to discontinue the re-production impermanently, to discontinue the re-production permanently, to turn back toward the head of the advertisement information, to re-produce the advertisement information at a higher speed than the normal speed, to turn back frames of the advertisement information, to forward the frames of the advertisement information, and to repeat re-producing the advertisement information. In this case, the control unit may comprise an indicator panel directly touched by the operator. Alternatively, the control unit may comprise a wire-less remote controller. Further, alternatively, the control unit may comprise a wire remote controller.

It is also preferable that the control unit comprises a voice access controller having a voice-recognition processor.

It is also preferable to further comprise a timer being connected to the control unit for counting a time from the accumulation of the advertisement information and informing the control unit of a counting time to enable the control unit to instruct the re-producing unit to re-produce the advertisement information when a predetermined time has passed from the accumulation of the advertisement information.

Alternatively, it is also preferable that the controller has an additional function of a timer for counting a time from the accumulation of the advertisement information to instruct the re-producing unit to re-produce the advertisement information when a predetermined time has passed from the accumulation of the advertisement information.

It is preferable that the system is loaded on a vehicle.

The second present invention provides a method of providing broadcast informations. The method comprises the steps of: receiving both program and advertisement informations broadcasted; re-producing both the program and advertisement informations; extracting only the advertisement information from the program and advertisement informations; accumulating the extracted advertisement information; and reproducing at least one operator-selected advertisement information.

It is preferable that a current re-producing of both the program and advertisement informations is discontinued and in place the at least operator-selected advertisement information is re-produced upon receipt of an interruption instruction of the operator.

It is also preferable that the extraction of only the advertisement information from the program and advertisement informations is made in accordance with an identification code allocated to the advertisement information.

It is further preferable that the program and advertisement informations are broadcasted via either radio-broadcasting or television-broadcasting.

It is also preferable that the extraction of only the advertisement information from the program and advertisement informations is made in accordance with a predetermined frequency signal allocated to the advertisement information.

It is further preferable that the program and advertisement informations are broadcasted via either radio-broadcasting or television-broadcasting.

It is also preferable that the at least operator-selected one of the accumulated advertisement informations is re-produced in accordance with a predetermined description of attribute for re-producing the advertisement information.

It is further preferable that the predetermined description of attribute is a first type attribute to re-produce the advertisement information always belonging to broadcasts of a predetermined broadcast program.

It is also preferable that the advertisement information is re-produced repeatedly in accordance with the first type attribute.

It is also preferable that the predetermined description of attribute is a second type attribute to re-produce the advertisement information at a predetermined normal speed until the last of the advertisement information once.

It is further preferable that the advertisement information is re-produced repeatedly in accordance with the second type attribute.

It is also preferable that the extracted advertisement information is distinguished into both a guidance information which corresponds to an initial part of the extracted advertisement information and a full information which corresponds to an entire of the extracted advertisement information, and the guidance information and the full information are separately accumulated, and the guidance information is first re-produced to wait for an operator's request for re-producing the full information, before the full information is re-produced only when receipt of the operator's request.

It is also preferable that the advertisement information is re-produced when a predetermined time has passed from the accumulation of the advertisement information.

As described above, the system of providing broadcast informations, comprises: a receiving processing unit for receiving both program and advertisement informations broadcasted and for extracting only the advertisement information therefrom; a reproducing unit being connected to the receiving processing unit for fetching both the program and advertisement informations from the receiving processing unit and for re-producing both the program and advertisement informations; an accumulating unit being connected to the receiving processing unit for fetching only the extracted advertisement information from the receiving processing unit and for accumulating the advertisement information; and a control unit being operable by an operator and being connected to both the accumulating unit and the reproducing unit for fetching at least operator-selected one of the accumulated advertisement informations from the accumulating unit and for transferring the at least operator-selected advertisement information to the reproducing unit for enabling the reproducing unit to re-produce the at least operator-selected advertisement information. The control unit controls the reproducing unit to discontinue a current re-producing of both the program and advertisement informations and in place re-produce the at least operator-selected advertisement information upon receipt of an interruption instruction of the operator. As a result, the advertisement informations on broadcasting are once recorded or accumulated for allowing the audiences to re-produce the selected one or more advertisement informations that might be interesting to them at any time when they wish to hear or listen, so that they listen the interesting ones repeatedly. The permission of the repeat listening by the audiences increases the effect of the advertisement and responds to the sponsor's or advertiser's expectations.

The receiving processing unit may recognize an identification code allocated to the advertisement information for extracting only the advertisement information from the program and advertisement informations broadcasted. The program and advertisement informations may be broadcasted via either radio-broadcasting or television-broadcasting. The receiving processing unit may also recognize a predetermined frequency signal allocated to the advertisement information for extracting only the advertisement information from the program and advertisement informations broadcasted. In this case, the program and advertisement informations may also be broadcasted via either radio-broadcasting or television-broadcasting. The control unit may fetch the at least operator-selected one of the accumulated advertisement informations in accordance with a predetermined description of attribute for re-producing the advertisement information. In this case, the predetermined description of attribute may be a first type attribute to re-produce the advertisement information always belonging to broadcasts of a predetermined broadcast program. The advertisement information may be re-produced repeatedly in accordance with the first type attribute. Alternatively, the predetermined description of attribute may be a second type attribute to re-produce the advertisement information at a predetermined normal speed until the last of the advertisement information once. In this case, the advertisement information may be re-produced repeatedly in accordance with the second type attribute. The above-described preferable modes of practicing the present invention provide such large advertisement effects as expected by the advertisers or sponsors.

The reproducing unit may comprise a voice output unit, a display unit or a printing unit or combinations thereof in accordance with the desire of the audiences. If the printing unit is used, then the advertisement informations remain written papers.

The receiving processing unit may distinguish the extracted advertisement information into both a guidance information which corresponds to an initial part of the extracted advertisement information and a full information which corresponds to an entire of the extracted advertisement information, and the accumulating unit may accumulate the guidance information and the full information separately, and the control unit may transfer the guidance information to the re-producing unit to re-produce the guidance information to wait for an operator's request for re-producing the full information, before the control unit transfers the full information to the re-producing unit to re-produce the full information only when receipt of the operator's request. This allows only audience-desired one of the advertisement informations to be re-produced quickly.

The control unit may control the re-producing unit to re-produce the advertisement information at a normal speed, to discontinue the re-production impermanently, to discontinue the re-production permanently, to turn back toward the head of the advertisement information, to re-produce the advertisement information at a higher speed than the normal speed, to turn back frames of the advertisement information, to forward the frames of the advertisement information, and to repeat re-producing the advertisement information. In this case, the control unit may comprise an indicator panel directly touched by the operator. Alternatively, the control unit may comprise a wire-less remote controller. Further, alternatively, the control unit may comprise a wire remote controller. These variable choices to the operator to operate the control unit makes it convenient for the operator to obtain the desired advertisement informations.

The control unit may comprise a voice access controller having a voice-recognition processor. It is possible to further provide a timer being connected to the control unit for counting a time from the accumulation of the advertisement information and informing the control unit of a counting time to enable the control unit to instruct the re-producing unit to re-produce the advertisement information when a predetermined time has passed from the accumulation of the advertisement information. Alternatively, the controller may have an additional function of a timer for counting a time from the accumulation of the advertisement information to instruct the re-producing unit to re-produce the advertisement information when a predetermined time has passed from the accumulation of the advertisement information. This makes it easy for the audience to obtain the advertisement informations.

PREFERRED EMBODIMENT

Figure 2:
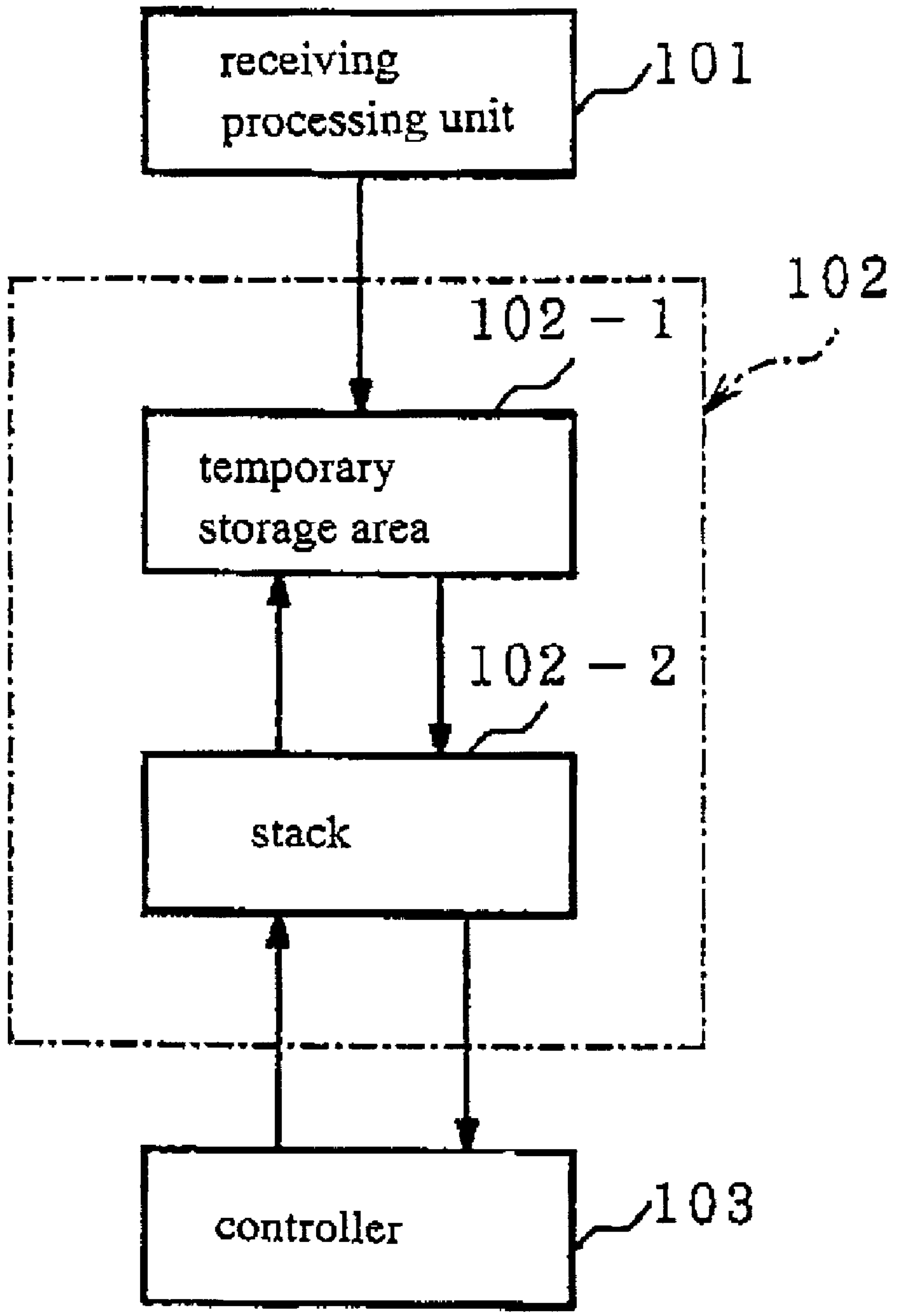
FIG. 2 is a block diagram illustrative of a memory in the novel system shown in FIG. 1 in the first embodiment in accordance with the present invention.
Figure 3:
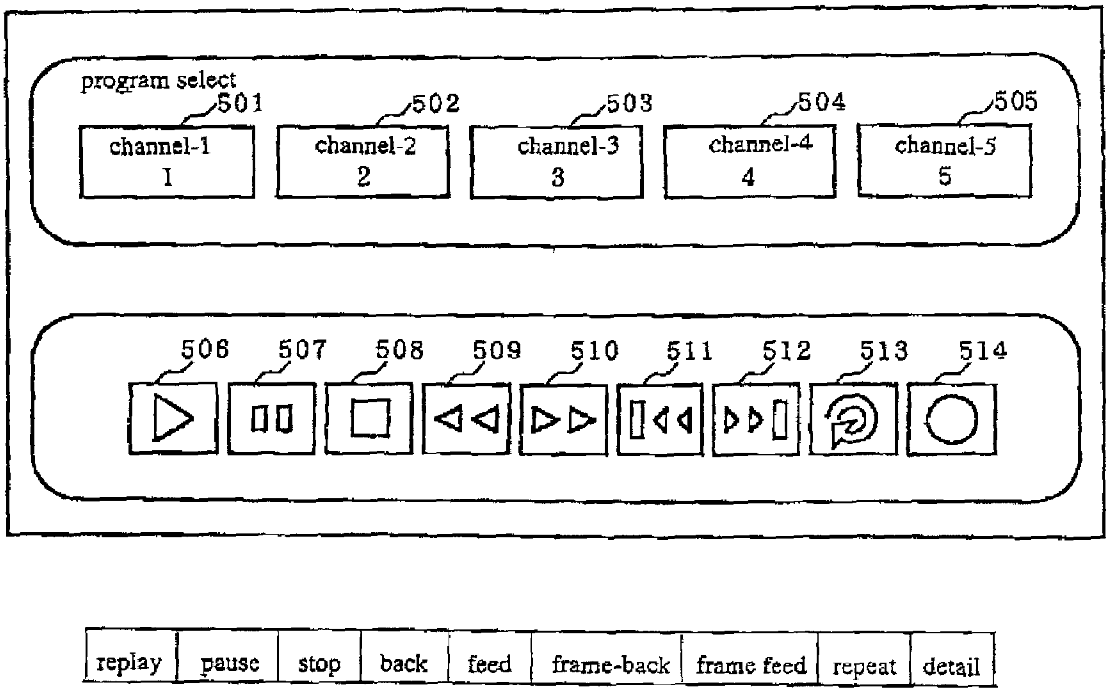
FIG. 3 is a plane view illustrative of control panel in the novel system shown in FIG. 1 in the first embodiment in accordance with the present invention.

A first embodiment according to the present invention will be described in detail with reference to the drawings. FIG. 1 is a block diagram illustrative of a novel system for providing broadcasting informations in a first embodiment in accordance with the present invention. FIG. 2 is a block diagram illustrative of a memory in the novel system shown in FIG. 1 in the first embodiment in accordance with the present invention. FIG. 3 is a plane view illustrative of control panel in the novel system shown in FIG. 1 in the first embodiment in accordance with the present invention.

A system 100 has a receiving processing unit 101, a memory 102, a control panel 103, and a re-producing processor 104. The receiving processor 101 receives a multi-channel digital satellite broadcasting such as multiplex PCM system broadcasting which comprises a program broadcasting and an advertisement broadcasting and extracts a program information and an advertisement information from the broadcasting on the basis of identification codes ID belonging to the program broadcasting and the advertisement broadcasting. The memory 102 is connected to the receiving processor 101 for receiving the extracted advertisement information from the receiving processor 101 and storing or accumulating the same. The control panel 103 is operable by an audience and connected to the memory 102 for making an access to the memory 102 for transferring an audience-selected advertisement information to the re-producing processor 104 in accordance with an instruction entered by the audience from the control panel 103. The re-producing processor 104 is connected to the receiving processor 101 for receiving the program information and the advertisement information from the receiving processor 101 and re-producing the program information and the advertisement information. The re-producing processor 104 is connected to the control panel 103 for receiving the audience-selected advertisement information from the control panel 103 and re-producing the audience-selected advertisement information. The control panel 103 is provided with a microphone 103*a* for allowing voice recognition such as speaker recognition with a pattern-matching processing in sequential word recognition for the purpose of operational directions such as re-produce, pause, stop, feed-back, feed, frame-feed, frame-feed-back, repeat, instruct detailed advertisement information.

The receiving processor 101 has a high frequency amplifier, a receiving frequency selector/converter, an intermediate frequency amplifier and a PCM data re-producing processor. The receiving processor 101 receives the multi-channel digital satellite broadcasting from an antenna and extracts both the program information and the advertisement information as analog signals for transmitting the analog signal program and advertisement informations to the re-producing processor 104. The receiving processor 101 also extracts the advertisement information as digital signals for transmitting the digital signal advertisement information to the memory 102.

The control panel 103 may comprise a memory controller which is capable of access to the memory 102 in accordance with a re-producing instruction signal, so that the control panel 103 fetches the advertisement information including both a guide information part and a detailed information part from the memory 102 and then transmits the fetched advertisement information to the re-producing processor 104 together with the re-producing instruction signal.

The re-producing processor 104 may be provided with an audio variable amplifier for carrying out a stereo voice output. The re-producing processor 104 receives the digital signals of the advertisement information transmitted through the control panel 103 from the memory 102. The re-producing processor 104 performs a digital-to-analog conversion of the digital signals of the advertisement information to generate audio analog signals for the advertisement information and transmits the audio signals to an audio device such as a speaker. The audio signals include a sound volume which has been set in accordance with a sound volume instruction signal from the control panel 103. The re-producing processor 104 also receives the analog signals of the program and advertisement informations from the receiving processor 101 to generate audio analog signals for the program and advertisement informations and transmits the audio signals to the audio device.

As shown in FIG. 2, the memory 102 comprises a temporary storage area 102-1 and a stack 102-2. The temporary storage area 102-1 is connected to the receiving processor 101 and the stack 102-2 for temporary-storing the advertisement information. The stack 102-2 is connected to the temporary storage area 102-1 and connected to the control panel 103 for carrying out processes for storing the advertisement information to the temporary storage area 102-1 and for retracting the advertisement information for re-producing the same. As shown in FIG. 1, the memory 102 has plural memory areas 102*a*, 102*b*, 102*c* - - - . Each of the plural memory areas 102*a*, 102*b*, 102*c* - - - , includes an identification code ID, a guide advertisement information, a detailed advertisement information, and an attribute information. The guide advertisement information may comprise an initial part of the advertisement information. The detailed advertisement information may comprise entire parts of the advertisement information. Each set of the guide advertisement information, the detailed advertisement information, and the attribute information is allocated with an individual identification code for storing the advertisement information into each of the memory areas of the memory 102.

The attribute information comprises descriptions about how to re-produce the advertisement information as designated by the advertiser or sponsor, wherein the descriptions may, for example, comprise (1) re-producing the advertisement information belonging to the predetermined program, and (2) re-producing at least one time the advertisement information at a constant speed which corresponds to the normal speed. This attribute information contributes to allow the audience to correctly and quickly recognize the contents of the advertisement information. As a result, the effect of the advertisement is so large as expected by the advertiser or sponsor.

The above-structured system 100 is operated as follows. The receiving processor 101 receives the multi-channel digital satellite broadcasting which comprises both the program information and the advertisement information. The receiving processor 101 extracts only the advertisement information on the basis of the identification codes ID of the program information and the advertisement information. The program information is transmitted from the receiving processor 101 to the re-producing processor 104, whilst the advertisement information is transmitted from the receiving processor 101 to the memory 102 for storing the advertisement information into the memory 102.

In case that the advertisement information is fetched from the memory 102 by the control panel 103, new data in the stack 102-2 in the memory 102 are first fetched. During when the control panel 103 has an access to the memory 102 and the advertisement information in the stack 102-2 is re-produced by the re-producing processor 104, the other advertisement information transmitted from the receiving processor 101 is accumulated in the temporary storage area 102-1 of the memory 102. After the advertisement information in the stack 102-2 has been re-produced by the re-producing processor 104, then the re-producing processor 104 re-produces the program information and the advertisement information transmitted directly from the receiving processor 101, during which the advertisement information temporary accumulated in the temporary storage area 102-1 is transmitted to the stack 102-2 for storing the advertisement information into the stack 102-2.

If the amount of the stored advertisement informations in the stack 102-2 reaches the maximum amount of the stack 102-2, then the oldest advertisement information is disposed or destroyed. If the attribute information of the advertisement information includes a designation of any program information to be re-produced just after or just before the re-production of this advertisement information, then at the same time when the former program information from the receiving processor 101 is changed to a new program information, the advertisement information belonging to the former program information is deleted from the memory 102 and in place a new advertisement information belonging to the new program information is newly stored in the memory 102.

The advertisement information is fetched from the memory 102 by the control panel 103 and transmitted to the re-producing processor 104. The attribute information is also transmitted to the re-producing processor 104. The re-producing processor 104 processes the advertisement information on the basis of the attribute information to generate the audio signals of the advertisement information and transmit the audio signals to the audio device such as the speaker.

Figure 4:
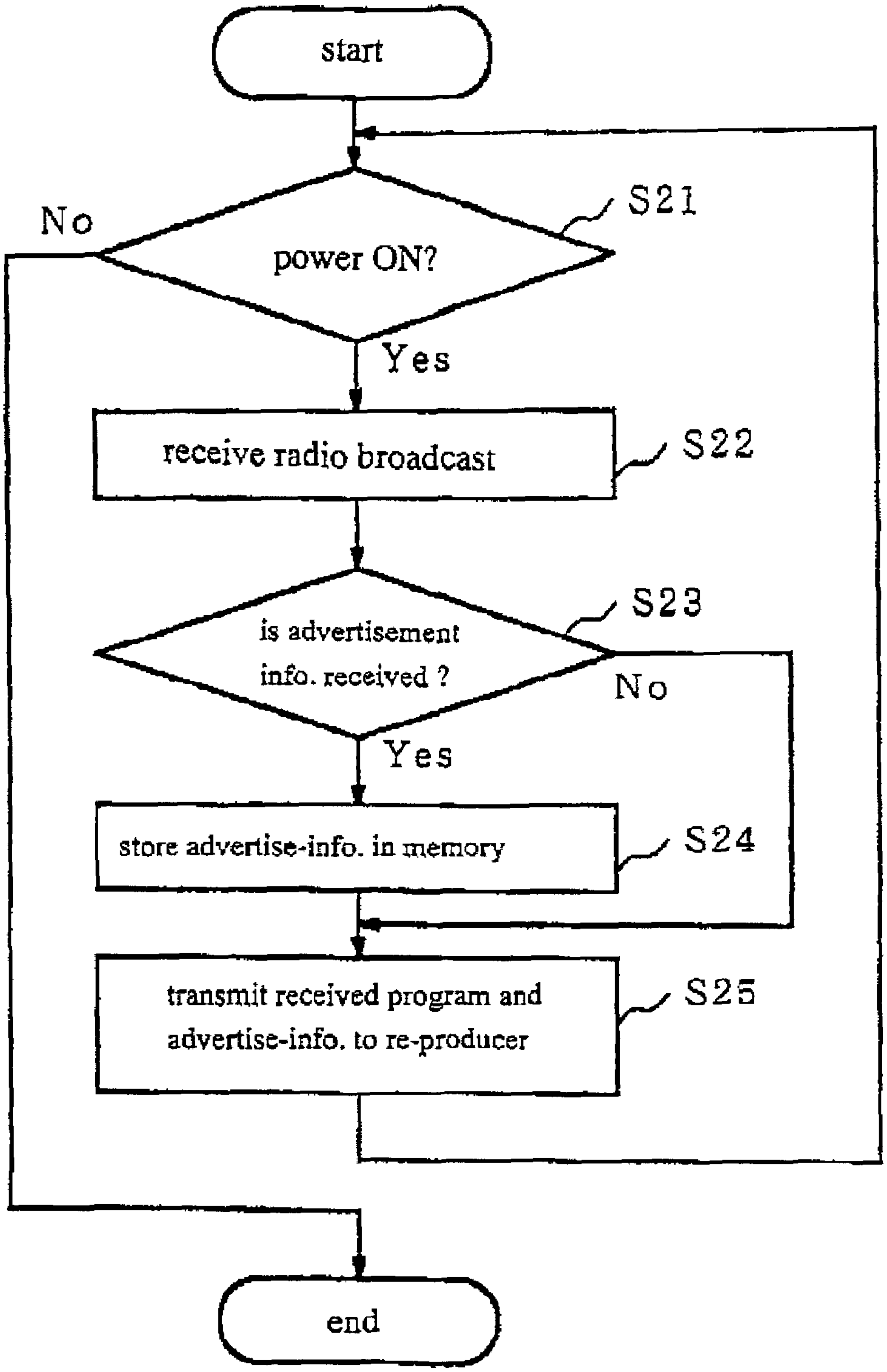
FIG. 4 is a flow chart illustrative of operations of the receiving processor provided in the system shown in FIG. 1 in the first embodiment in accordance with the present invention.
Figure 5:
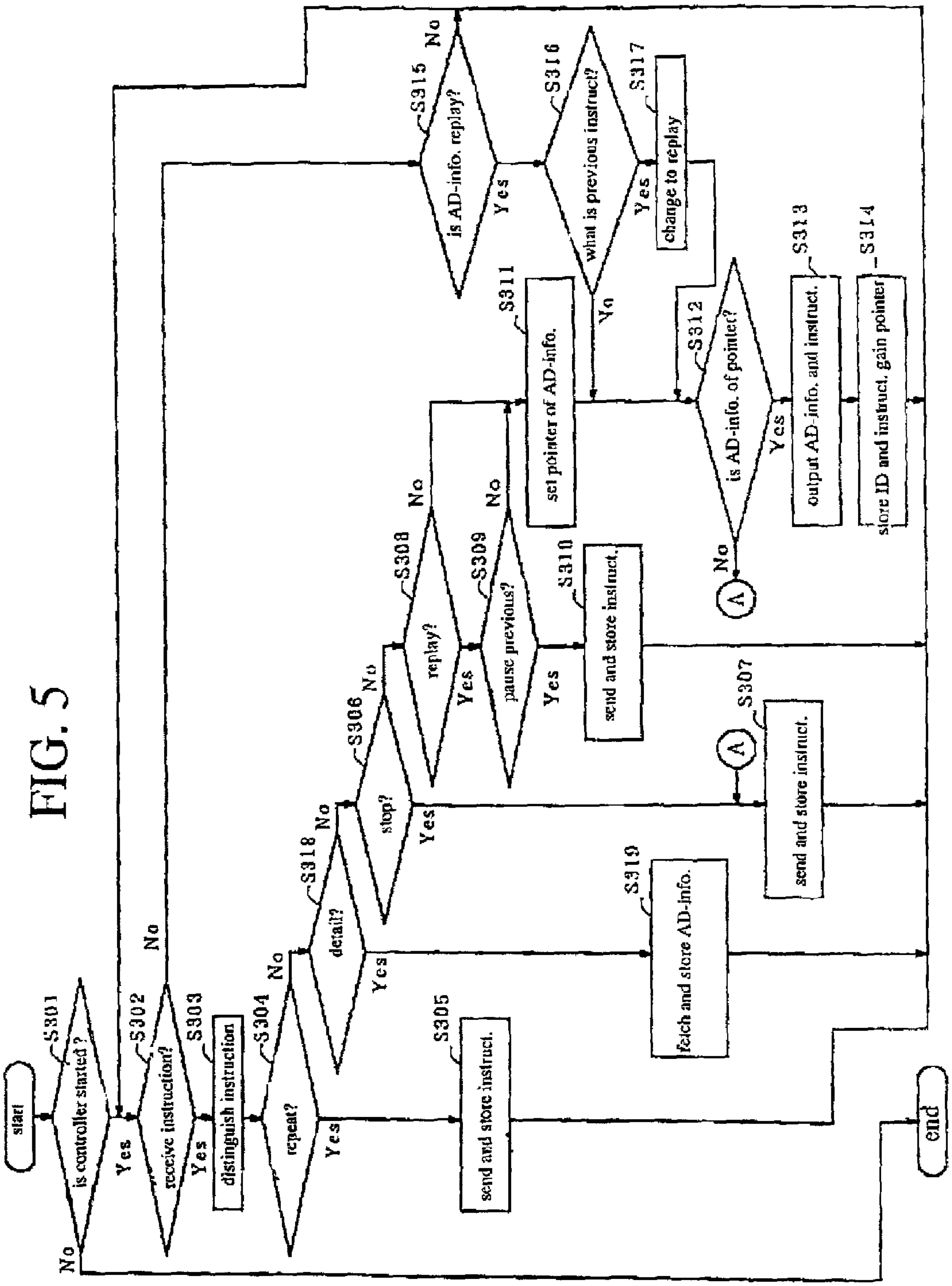
FIG. 5 is a flow chart illustrative of operations of the control panel provided in the system shown in FIG. 1 in the first embodiment in accordance with the present invention.
Figure 6:
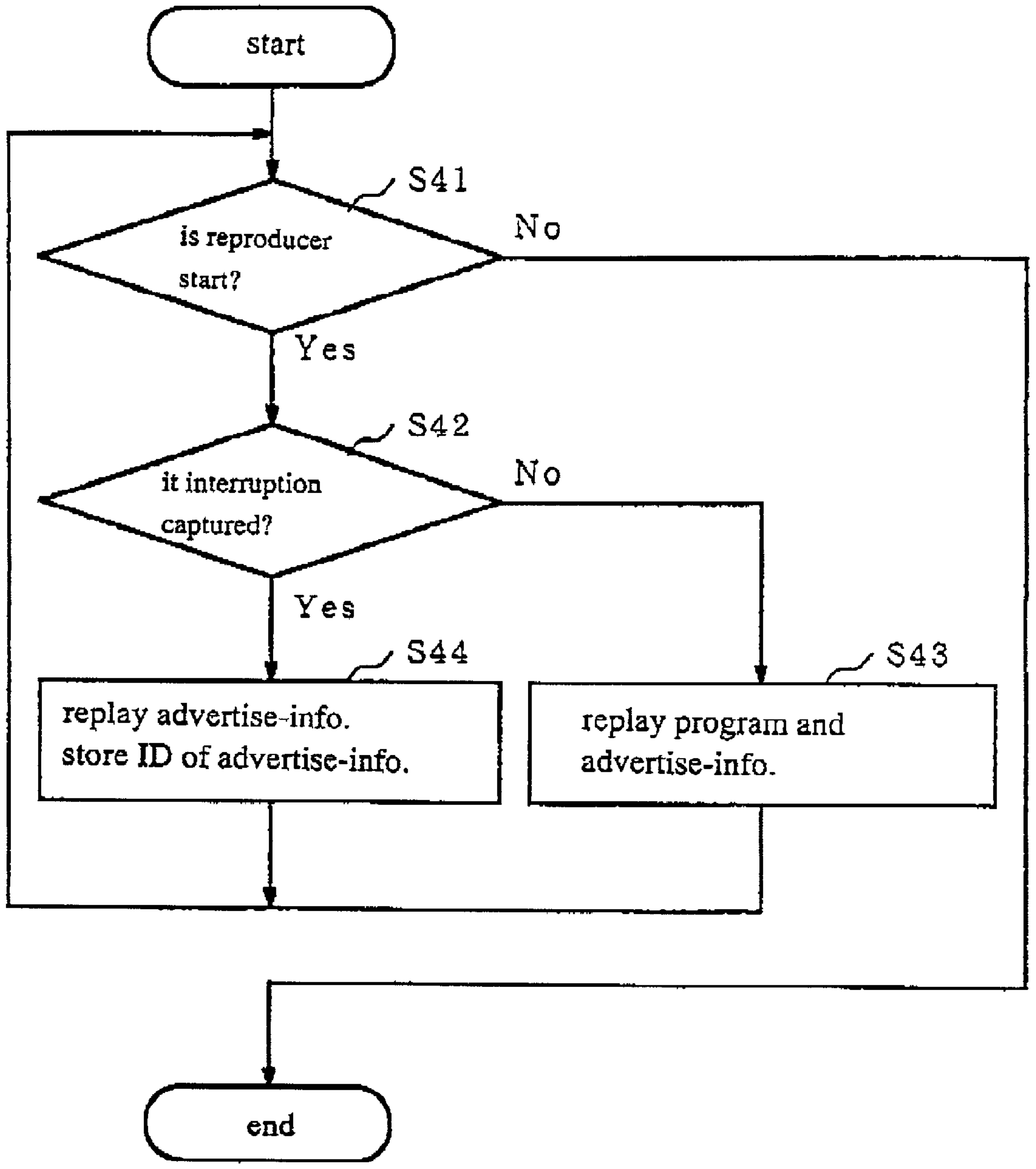
FIG. 6 is a flow chart illustrative of operations of the re-producing processor provided in the system shown in FIG. 1 in the first embodiment in accordance with the present invention.

Operations of the above system will be described in detail with reference to the drawings. FIG. 4 is a flow chart illustrative of operations of the receiving processor provided in the system shown in FIG. 1 in the first embodiment in accordance with the present invention. FIG. 5 is a flow chart illustrative of operations of the control panel provided in the system shown in FIG. 1 in the first embodiment in accordance with the present invention. FIG. 6 is a flow chart illustrative of operations of the re-producing processor provided in the system shown in FIG. 1 in the first embodiment in accordance with the present invention.

Operations of the receiving processor 101 will be described with reference to FIG. 4.

In a first step S21, power-ON is verified.

In a second step S22, the receiving processor 101 receives the multi-channel digital satellite broadcasting which comprises both the program information and the advertisement information.

In a third step S23, the receiving processor 101 recognizes that the received data include the identification code ID of the advertisement information.

In a fourth step S24, the receiving processor 101 transfers the advertisement information to the memory 102 for storing the advertisement information together with the identification code ID into the memory 102.

In a fifth step S25, the receiving processor 101 transfers the program and advertisement informations as received to the re-producing processor 104.

Operations of the control panel 103 will be described with reference to FIG. 5.

In a first step S301, it is verified that the control panel 103 is started.

In a second step S302, the control panel 103 receives the entry of the instruction from the audience. The instruction may, for example, be "re-produce", "pause", "stop", "feed-back", "feed", "frame-back", "frame-feed", "repeat", and "detail". The audience pushes any of a channel-1 button switch 501, a channel-2 button switch 502, a channel-3 button switch 503, a channel-4 button switch 504, and a channel-5 button switch 505 to select any one of the channel-1, the channel-2, the channel-3, the channel-4, and the channel-5, whereby the selected program and advertisement informations are broadcasted on the selected channel. The audience may push any of a "re-produce" button switch 506, a "pause" button switch 507, a "stop" button switch 508, a "feed-back" button switch 509, a "feed" button switch 510, a "frame-back" button switch 511, a "frame-feed" button switch 512, a "repeat" button switch 513, and a "detail" button switch 514. The audience may push the "re-produce" button switch 506 during the broadcast of the selected program and advertisement informations on the selected channel so as to enter the "re-produce" instruction to re-produce the advertisement information accumulated in the memory 102. The audience may push the "repeat" button switch 513 during the broadcast of the advertisement information so as to enter the "repeat" instruction to repeat the re-production of the advertisement information. The audience may push the "pause" button switch 507 during the broadcast of the advertisement information so as to enter the "pause" instruction to pause the re-production of the advertisement information. The audience may push the "feed-back" button switch 509 during the broadcast of the advertisement information so as to enter the "feed-back" instruction to feed-back the advertisement information. The audience may push the "frame feed-back" button switch 511 during the broadcast of the advertisement information so as to enter the "frame feed-back" instruction to frame feed-back to the already re-produced frame of the advertisement information. The audience may push the "feed" button switch 510 during the broadcast of the advertisement information so as to enter the "feed" instruction to feed the next advertisement information. The audience may push the "frame feed" button switch 512 during the broadcast of the advertisement information so as to enter the "frame feed" instruction to frame feed to the next frame of the advertisement information. The audience may push the "detail" button switch 514 during the broadcast of the advertisement information so as to enter the "detail" instruction to re-produce the full contents of the advertisement information. The advertisement information includes both the guide information part and the detailed information part. Each of the memory areas 102$a$, 102$b$, 102$c$ - - - stores the guide information and the detailed information as well as the identification codes thereof. The guide information and the detailed information are identified with the identification codes ID for fetching the guide information and the detailed information from the memory area and transmitting the fetched guide and detailed informations to the control panel 103. The audience may push the "stop" button switch 508 during the broadcast of the advertisement information so as to enter the "stop" instruction to stop or discontinue the re-production of the advertisement information and in place re-start the re-production of the currently broadcasted program and advertisement informations transmitted from the receiving processor 101. Further, the control panel 103 is provided with the microphone 103$a$ for allowing the audience to enter voice-instruction to the control panel 103, wherein the voice-instruction from the audience is voice-recognized to enter corresponding one of the instructions such as "re-produce", "pause", "stop", "feed-back", "feed", "frame-back", "frame-feed", "repeat", and "detail".

In a third step S303, the control panel 103 executes the entered instruction. The advertisement information stored in each of the memory areas 102$a$, 102$b$, 102$c$, - - - comprises both the guide information and the detailed information. Upon receipt of the "re-produce" instruction, the guide information is re-produced. Upon receipt of the "detail" instruction, the detailed information is re-produced. If the audience needs the guide information only, then the audience does not enter the "detail" instruction.

In a fifth step S305, the control panel 103 has an access to the memory 102 to pick up the advertisement informations one by one for transmitting the advertisement informations and the operational instructions including the re-producing method described in the attribute informations to the re-producing processor 104. The control panel 103 also stores the identification code ID of the advertisement information and the operational instruction as transmitted to the re-producing processor 104.

The following descriptions will focus on the details of the processes of the control panel 103 to control the re-producing processor 104. In FIG. 5, if the control panel 103 receives an entry of an instruction "pause" or "repeat" in the fourth step S304, then the control panel 103 sends the re-producing processor 104 the received instruction "pause" or "repeat" in the fifth step S305, and further the control panel 103 stores the instruction "pause" or "repeat" therein.

If the control panel 103 receives an entry of an instruction "stop" in the step S306, then the control panel 103 sends the re-producing processor 104 the received instruction "stop" in the step S307, and further the control panel 103 stores the instruction "stop" therein. If the control panel 103 receives an entry of an instruction "re-produce" in the step S308 and further if it is verified that the previously received instruction was "pause" in the step S309, then the control panel 103 sends the re-producing processor 104 the received instruction "re-produce" in the step S310, and further the control panel 103 stores the instruction "stop" therein.

If the control panel 103 receives an entry of an instruction "re-produce" in the step S308 and further if it is verified that the program and advertisement informations are on the re-production in the step S309, then the control panel 103 a pointer to the advertisement information to be re-produced is set to the newest one of the advertisement informations stored in the memory 102 in the step S311. The control panel 103 sends the re-producing processor 104 both the advertisement information represented by the pointer and the instruction "re-produce" in the steps S312 and S313. At this time, the control panel 103 stores the identification code ID of the advertisement information now on re-production and the instruction "re-produce" therein and also put the pointer of the memory 102 forward by one in the step S314.

If the control panel 103 receives an entry of an instruction "frame-feed" or "feed" in the step S308, then the control panel 103 sets the pointer to the previously stored advertisement information in the memory 102 just prior to the advertisement information now on re-production in the step S311. The control panel 103 sends the re-producing processor 104 both the advertisement information represented by the pointer and the instruction "frame-feed" or "feed" in the steps S312 and S313. At this time, the control panel 103 stores the identification code ID of the advertisement information now on re-production and the instruction "frame-feed" or "feed" therein and also put the pointer of the memory 102 forward by one in the step S314.

If the control panel 103 receives an entry of an instruction "frame feed-back" or "feed-back" in the step S308, then the control panel 103 sets the pointer to the previously stored advertisement information in the memory 102 just prior to the advertisement information now on re-production in the step S311. The control panel 103 sends the re-producing processor 104 both the advertisement information represented by the pointer and the instruction "frame feed-back" or "feed-back" in the steps S312 and S313. At this time, the control panel 103 stores the identification code ID of the advertisement information now on re-production and the instruction "frame feed-back" or "feed-back" therein and also put the pointer of the memory 102 forward by one in the step S314.

If the control panel 103 receives an entry of an instruction "detail" in the step S318, then the control panel 103 sends the re-producing processor 104 both the advertisement information represented by the pointer and the instruction "detail" in the step S319. At this time, the control panel 103 stores the instruction "detail" therein.

If it is verified that the control panel 103 is now on re-production of the advertisement information as stored in the memory 102 without receipt of any instruction from the audience in the step S315, and if it is verified that the previous instruction is either "feed-back", "frame-back", "frame-feed", "repeat", or "detail" in the step S316, then the control panel 103 changes this instruction to the instruction "re-produce" in the step S317. The control panel 103 sends the re-producing processor 104 both the advertisement information represented by the pointer from the memory 102 and the instruction "re-produce" sequentially in the steps S313 and S314.

If it is verified that the control panel 103 is now on re-production of the advertisement information as stored in the memory 102 without receipt of any instruction from the audience in the step S315, and if it is verified that the previous instruction is either "feed", or "re-produce" in the step S315, then the control panel 103 does not change this instruction and sends the re-producing processor 104 both the advertisement information represented by the pointer from the memory 102 and the instruction sequentially in the steps S313 and S314. If it is verified that any advertisement information represented by the pointer does not remain in the step S312, the control panel 103 sends the re-producing processor 104 the instruction "stop".

Operations of the re-producing processor 104 will subsequently be described with reference to FIG. 6.

In the step S41, the re-producing processor 104 is started. If it is verified that the re-producing processor 104 have not yet received any interruption instruction or the instruction "re-produce" for re-producing the advertisement information from the control panel 103 in the step S42, then the re-producing processor 104 re-produces the program and advertisement informations transmitted from the receiving processor 101 in the step S43. If, however, it is verified that the re-producing processor 104 received the interruption instruction or the instruction "re-produce" for re-producing the advertisement information from the control panel 103 in the step S42, then the re-producing processor 104 executes the instruction "re-produce" for re-producing the advertisement information in the step S44. At this time, the re-producing processor 104 stores the identification code ID of the advertisement information from the control panel 103 and this instruction therein. This receipt of the interruption instruction causes that the re-production of the program information is discontinued in place to re-produce the advertisement information.

Assuming that the re-producing processor 104 received the instruction "re-produce" from the control panel 103, the descriptions will be made here. If the re-producing processor 104 receives the interruption instruction or the instruction "re-produce" from the control panel 103 during re-production of the program and advertisement informations transmitted from the receiving processor 101, then the re-producing processor 104 discontinues the current re-production of the program and advertisement informations from the receiving processor 101 and in place re-produce the advertisement information from the control panel 103. If the re-producing processor 104 receives the interruption instruction or the instruction "re-produce" from the control panel 103 during posing the re-production of the advertisement information stored in the memory 102, then the re-producing processor 104 re-starts the re-production of the advertisement information from the control panel 103. If the re-producing processor 104 receives the interruption instruction or the instruction "re-produce" from the control panel 103 during the re-production of the other advertisement informations stored in the memory 102, then the re-producing processor 104 re-produce the advertisement information from the control panel 103 after the current re-production of the advertisement informations stored in the memory 102 has been completed.

If the re-producing processor 104 has the currently re-producing advertisement information when the re-producing processor 104 receives the instruction "frame-feed" from the control panel 103, then the re-producing processor 104 discontinues the current re-production of the advertisement information and in place re-produce the other advertisement information just received from the control panel 103. It is, for example, assumed that the advertisement information has the attribute information to the effect that the entire parts of the advertisement information are once re-produced at the normal speed. If the current re-production of the advertisement information is the first time, then the entire parts of the advertisement information are once re-produced at the normal speed before the advertisement information from the control panel 103 is then re-produced. If the current re-production of the advertisement information is the second or more time, then the re-producing processor 104 discontinues the current re-production and in place re-produces the advertisement information from the control panel 103.

If the re-producing processor 104 receives the instruction "feed" from the control panel 103, then the re-producing processor 104 re-produces the advertisement information just received from the control panel 103 at a higher speed than the normal speed. It is, for example, assumed that the advertisement information has the attribute information to the effect that the entire parts of the advertisement information are once re-produced at the normal speed. If the current re-production of the advertisement information is the first time, then the entire parts of the advertisement information are once re-produced at the normal speed. If the current re-production of the advertisement information is the second or more time, then the re-producing processor 104 re-produces the advertisement information from the control panel 103 at a higher speed than the normal speed.

If the re-producing processor 104 receives the instruction "frame-feed-back" from the control panel 103, then the re-producing processor 104 discontinues the current re-production and then again re-produces the advertisement information from the top or head of the frame. If the re-producing processor 104 receives the instruction "feed-back" from the control panel 103, then the re-producing processor 104 discontinues the current re-production and in place executes the re-production in the reverse direction.

If the re-producing processor 104 receives the instruction "repeat" from the control panel 103, then the re-producing processor 104 again re-produces the advertisement information after the current re-production of the advertisement information has been completed. If the re-producing processor 104 receives the instruction "detail" from the control panel 103, then the re-producing processor 104 discontinues the current re-production of the advertisement information and in place re-produces the detailed information of the advertisement information from the control panel 103. If the re-producing processor 104 receives the instruction "stop" from the control panel 103, then the re-producing processor 104 stops the current re-production or the current pause of the advertisement information and in place re-produces the program and advertisement informations transmitted from the receiving processor 101.

Figure 7:
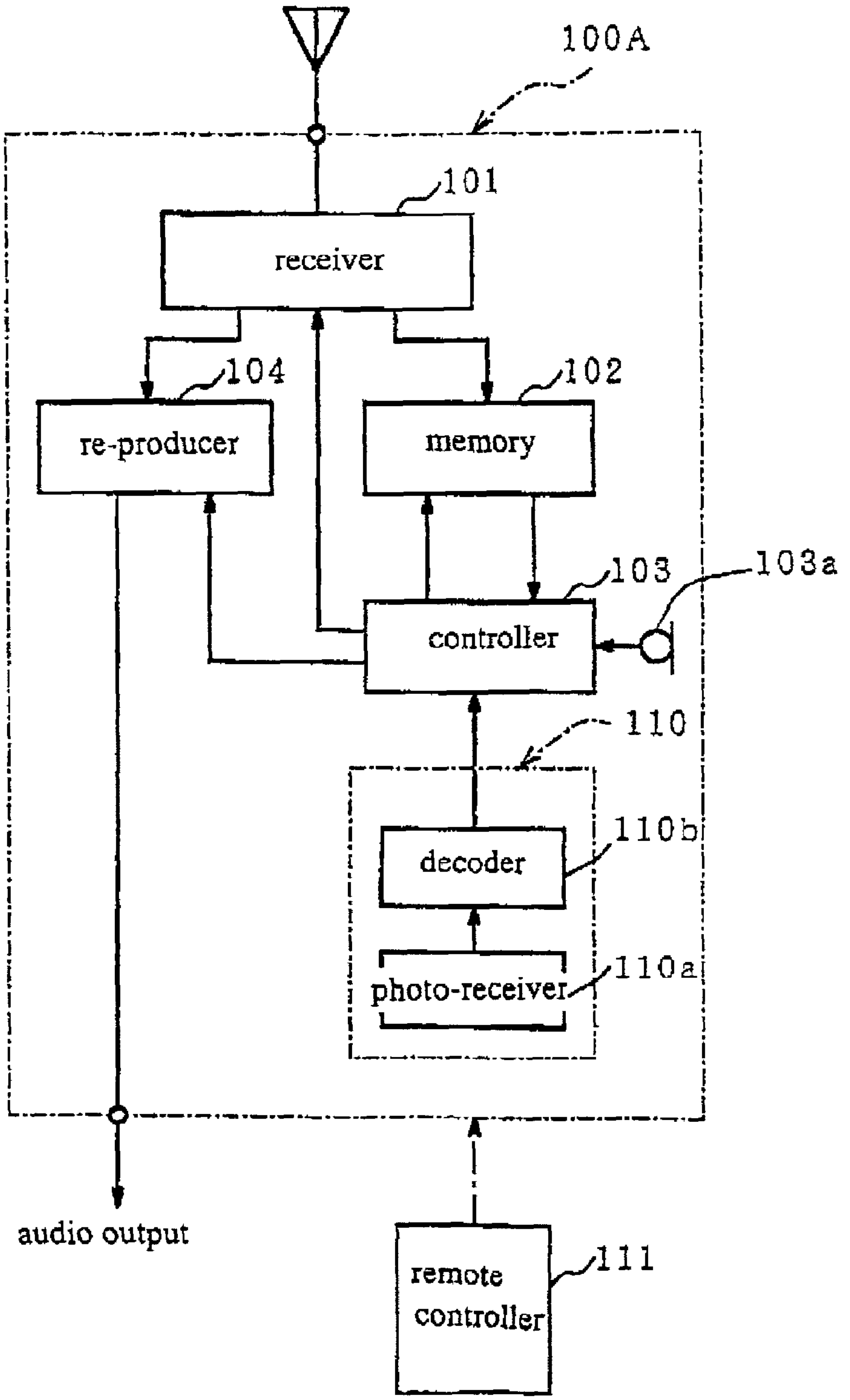
FIG. 7 is a block diagram illustrative of a second novel system remote-controllable in a second embodiment of the present invention.

A second embodiment of the present invention will be described. FIG. 7 is a block diagram illustrative of a second novel system remote-controllable in a second embodiment of the present invention. The second novel system 100A has the receiving processor 101, the memory 102, the control panel 103 and the re-producing processor 104 as in the first novel system 100 described in the above first embodiment. The second novel system 100A further has a remote control signal receiver 110 which is connected to the control panel 103, and a remote controller 111 for transmitting remote control signals to the remote control signal receiver 110. The remote control signal receiver 110 further comprises a light-receiving unit 110*a* and a decoder 110*b* connected to the light-receiving unit 110*a* and the control panel 103. The light-receiving unit 110*a* receives an infrared ray commend or instruction, for example, a set of specific frequency pulse signals transmitted from the remote controller 111 and carry out a photoelectric conversion of the infrared ray commend into electric signals. The decoder 110*b* receives the converted electric signals from the light-receiving unit 110*a* and decodes the same to send the decoded signals to the control panel 103.

The second novel system 100A is different in structure from the first novel system 100 only in further providing the remote control signal receiver 110 and the remote controller 111. The second novel system 100A is also different in operation from the first novel system 100 only in entry any instructions or commends through the remote control signal receiver 110 and the remote controller 111.

Figure 8:
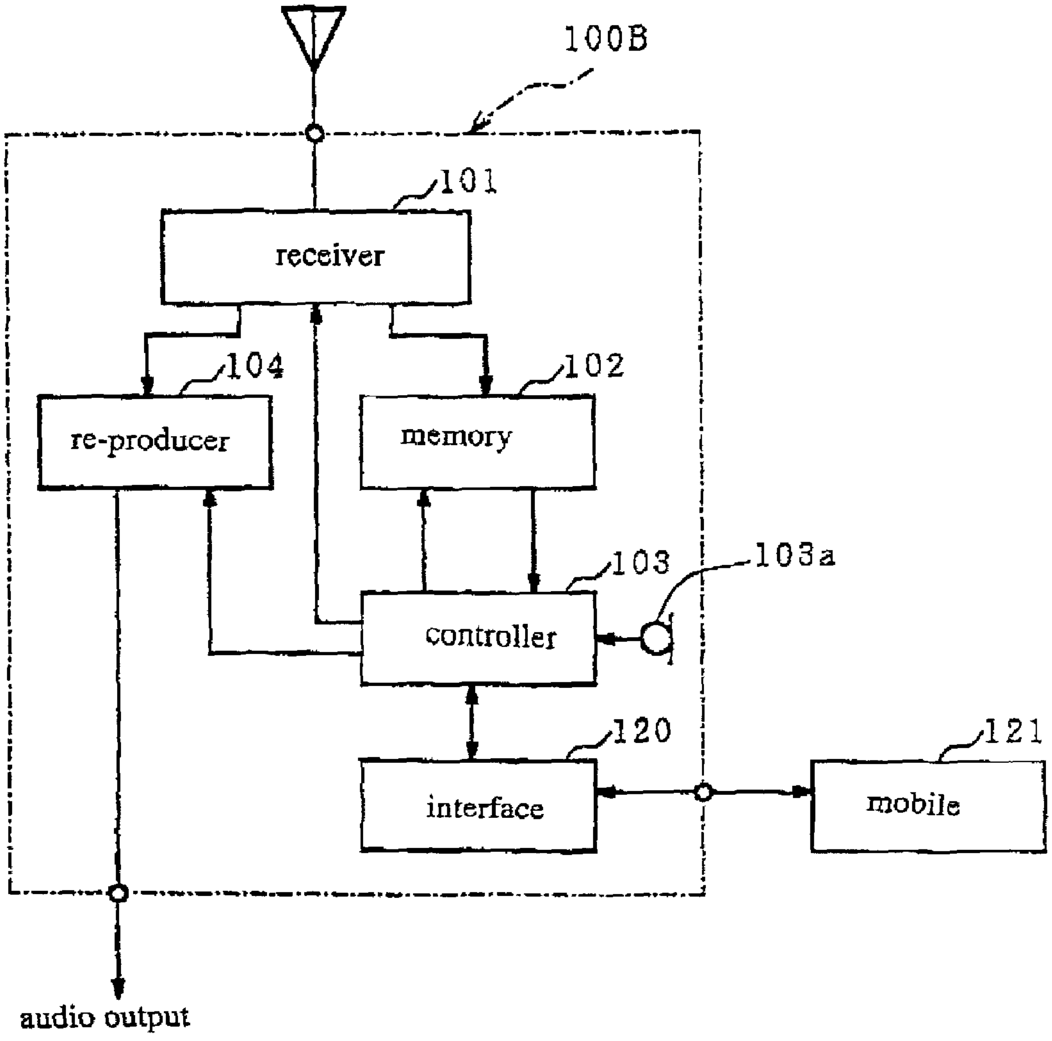
FIG. 8 is a block diagram illustrative of a third novel system remote-controllable in a third embodiment of the present invention.

A third embodiment of the present invention will be described. FIG. 8 is a block diagram illustrative of a third novel system remote-controllable in a third embodiment of the present invention. The third novel system 100B has the receiving processor 101, the memory 102, the control panel 103 and the re-producing processor 104 as in the first novel system 100 described in the above first embodiment. The third novel system 100B further has an interface 120 connected to the control panel 103 and a mobile computer 121 connected to the interface 120.

The same operational screen is displayed on a display of the mobile computer 121. A coordinate type input device is used for the operational screen, for example, an arrow mark commend over the flat coordinate type input device and a click operation are utilized to enter the instruction or commend through the mobile computer 121 and the interface 120 to the control panel 103.

The third novel system 100B is different in structure from the first novel system 100 only in further providing the interface 120 and the mobile computer 121. The third novel system 100B is also different in operation from the first novel system 100 only in entry any instructions or commends through the interface 120 and the mobile computer 121.

In the foregoing embodiments, the descriptions have been made by applying the system to the multi-channel digital satellite broadcasting. It is possible to apply the above novel systems to the multi-channel digital ground broadcasting.

It is also possible to apply the above novel systems to any analog broadcastings. In case of TV-broadcasting, it has been known to reduce the volume upon voice recognition. Inaudible frequency signal is used for recognizing the stereo broadcasting. The inaudible frequency signal is recognized by the receiving processor 101 to pick up the voice advertisement information and also carry out the analog-to-digital conversion of converting the inaudible frequency signal into digital signals to be stored in the memory 102. Other operations may be the same as described in the above first embodiments.

In this case, the re-production instruction may be entered by use of any one of the control panel, the radio or wire remote control and voice recognition process. The above novel systems may be loaded on any vehicles. Such variety of the practicable modes improves the freedom of the design of the system. If the audience is the driver for driving the vehicle, then the system makes it easy for the driver to obtain the advertisement information.

The above novel systems are also applicable to AM or FM broadcasting. In this case, identification signals for identifying the program information and the advertisement information are included in the broadcast. The identification signals have inaudible frequencies. The inaudible frequency signal is recognized by the receiving processor 101 to pick up the voice advertisement information and also carry out the analog-to-digital conversion of converting the inaudible frequency signal into digital signals to be stored in the memory 102. Other operations may be the same as described in the above first embodiments. In this case, this mode is applicable to various broadcasting types such as radio and TV broadcastings.

In the above foregoing embodiments, the advertisement informations are stored in the memory 102. Other storage mediums such as floppy disk or hard disk may be available together with a floppy disk drive or a hard disk drive in place of the memory 102, and further an input/output circuit and a control circuit for writing and reading the advertisement information from the receiving processor 101.

In the foregoing embodiments, the advertisement information is outputted from the re-producing processor 104 as the audio signals. It is possible that the advertisement information is outputted from the re-producing processor 104 as other mediums, for example, hard copies printed by the printer or displaying the advertisement information on the display screen such as liquid crystal display. The advertisement information may be recorded on the hard copies printed by the printer.

In the foregoing embodiments, the advertisement information is fetched from the memory 102 in accordance with the real-time entry of the instruction from real-time operation to the control panel 103. It is possible to automatically re-produce the advertisement information after a predetermined time has passed from accumulation of the advertisement information in the memory 102. A timer may be provided inside or outside the control panel 103 for counting the time to automatically re-produce the advertisement information after a predetermined time has passed from accumulation of the advertisement information in the memory 102.

As described above, the present invention provides the following advantages.

The control panel or the control unit controls the reproducing unit to discontinue a current re-producing of both the program and advertisement informations and in place re-produce the at least operator-selected advertisement information upon receipt of an interruption instruction of the operator. As a result, the advertisement informations on broadcasting are once recorded or accumulated for allowing the audiences to re-produce the selected one or more advertisement informations that might be interesting to them at any time when they wish to hear or listen, so that they listen the interesting ones repeatedly. The permission of the repeat listening by the audiences increases the effect of the advertisement and responds to the sponsor's or advertiser's expectations.

The receiving processing unit recognizes an identification code allocated to the advertisement information for extracting only the advertisement information from the program and advertisement informations broadcasted. The program and advertisement informations are broadcasted via either radio-broadcasting or television-broadcasting. The receiving processing unit also recognizes a predetermined frequency signal allocated to the advertisement information for extracting only the advertisement information from the program and advertisement informations broadcasted. The program and advertisement informations are broadcasted via either radio-broadcasting or television-broadcasting. The control unit fetches the operator-selected one of the accumulated advertisement informations in accordance with a predetermined description of attribute for re-producing the advertisement information. The predetermined description of attribute may be the first type attribute to re-produce the advertisement information always belonging to broadcasts of a predetermined broadcast program. The advertisement information may be re-produced repeatedly in accordance with the first type attribute. Alternatively, the predetermined description of attribute may be the second type attribute to re-produce the advertisement information at a predetermined normal speed until the last of the advertisement information once. In this case, the advertisement information may be re-produced repeatedly in accordance with the second type attribute. The above-described preferable modes of practicing the present invention provide such large advertisement effects as expected by the advertisers or sponsors.

The reproducing unit may comprise a voice output unit, a display unit or a printing unit or combinations thereof in accordance with the desire of the audiences. If the printing unit is used, then the advertisement informations remain written papers.

The receiving processing unit may distinguish the extracted advertisement information into both a guidance information which corresponds to an initial part of the extracted advertisement information and a full information which corresponds to an entire of the extracted advertisement information, and the accumulating unit may accumulate the guidance information and the full information separately, and the control unit may transfer the guidance information to the re-producing unit to re-produce the guidance information to wait for an operator's request for re-producing the full information, before the control unit transfers the full information to the re-producing unit to re-produce the full information only when receipt of the operator's request. This allows only audience-desired one of the advertisement informations to be re-produced quickly.

The control unit controls the re-producing unit to re-produce the advertisement information at a normal speed, to discontinue the re-production impermanently, to discontinue the re-production permanently, to turn back toward the head of the advertisement information, to re-produce the advertisement information at a higher speed than the normal speed, to turn back frames of the advertisement information, to forward the frames of the advertisement information, and to repeat re-producing the advertisement information. In this case, the control unit may comprise an indicator panel directly touched by the operator. Alternatively, the control unit may comprise a wire-less remote controller. Further, alternatively, the control unit may comprise a wire remote controller. These variable choices to the operator to operate the control unit makes it convenient for the operator to obtain the desired advertisement informations.

The control unit comprises a voice access controller having a voice-recognition processor. It is possible to further provide a timer being connected to the control unit for counting a time from the accumulation of the advertisement information and informing the control unit of a counting time to enable the control unit to instruct the re-producing unit to re-produce the advertisement information when a predetermined time has passed from the accumulation of the advertisement information. Alternatively, the controller may have an additional function of a timer for counting a time from the accumulation of the advertisement information to instruct the re-producing unit to re-produce the advertisement information when a predetermined time has passed from the accumulation of the advertisement information. This makes it easy for the audience to obtain the advertisement informations.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A system of providing broadcast informations, comprising:

a receiving processing unit constructed so as to receive both program and advertisement broadcast information, the receiving processing unit producing a combined output that contains both the program and advertisement information, as well as an ad-only output that contains only the advertisement information;

an accumulating unit that receives and accumulates the ad-only output from the receiving processing unit;

a control unit that is operable by an operator and connected to the accumulating unit, the control unit being responsive to operator input to fetch operator-selected said advertisement information from the accumulating unit and generate the operator-selected advertisement information as an output, the control unit also generating as an output reproducing instructions based on the operator input; and a reproducing unit that receives as inputs the combined output from the receiving processing unit and the operator-selected advertisement information and reproducing instructions from the control unit;

wherein the reproducing unit produces at a single output for the operator either the combined output or the operator-selected advertisement information in accordance with the operator input.

2. The system as claimed in claim 1, wherein the control unit controls the reproducing unit to discontinue a current production of combined output and in place re-produce the operator-selected advertisement information upon receipt of an interruption instruction from the operator.

3. The system as claimed in claim 1, wherein the receiving processing unit recognizes an identification code allocated to the broadcast advertisement information for extracting only the advertisement information from the program and advertisement broadcast information.

4. The system as claimed in claim 3, wherein the program and advertisement information are broadcast via one of radio-broadcasting and television-broadcasting.

5. The system as claimed in claim 1, wherein the receiving processing unit recognizes a predetermined frequency signal allocated to the advertisement information for extracting only the advertisement information from the program and advertisement broadcast information.

6. The system as claimed in claim 5, wherein the program and advertisement information are broadcast via one of radio-broadcasting and television-broadcasting.

7. The system as claimed in claim 1, wherein the control unit fetches the operator-selected advertisement informations from the accumulating unit in accordance with a predetermined description of an attribute for producing the advertisement information.

8. The system as claimed in claim 7, wherein the predetermined description of an attribute is a first type attribute to produce the advertisement information always included with broadcasts of a predetermined broadcast program.

9. The system as claimed in claim 8, wherein the advertisement information is produced repeatedly in accordance with the first type attribute.

10. The system as claimed in claim 7, wherein the predetermined description of attribute is a second type attribute to produce one time the advertisement information at a predetermined normal speed until reaching an end of the advertisement information.

11. The system as claimed in claim 10, wherein the advertisement information is produced repeatedly in accordance with the second type attribute.

12. The system as claimed in claim 1, wherein the reproducing unit comprises at least one of a voice output unit, a display unit and a printing unit.

13. The system as claimed in claim 1, wherein the receiving processing unit distinguishes the extracted advertisement information into both guidance information which corresponds to only an initial part of the extracted advertisement information and full information which corresponds to an entirety of the extracted advertisement information, and the accumulating unit accumulates the guidance information and the full information separately, and the control unit transfers the guidance information to the producing unit to produce the guidance information to wait for an operator's request for producing the full information, before the control unit transfers the full information to the producing unit to produce the full information only upon receipt of the operator's request.

14. The system as claimed in claim 1, wherein the control unit selectively controls the producing unit to produce the advertisement information at a normal speed, to discontinue the production temporarily, to discontinue the production permanently, to turn back toward a beginning of the advertisement information, to produce the advertisement information at a higher speed than the normal speed, to turn back frames of the advertisement information, to advance forward the frames of the advertisement information, and to repeat producing the advertisement information.

15. The system as claimed in claim 14, wherein the control unit comprises an indicator panel arranged to be directly touched by the operator.

16. The system as claimed in claim 14, wherein the control unit comprises a wireless remote controller.

17. The system as claimed in claim 14, wherein the control unit comprises a wired remote controller.

18. The system as claimed in claim 14, wherein the control unit comprises a voice access controller having a voice-recognition processor.

19. The system as claimed in claim 1, further comprising a timer connected to the control unit for counting a time from the accumulation of the advertisement information and informing the control unit of a counting time to enable the control unit to instruct the producing unit to produce the advertisement information when a predetermined time has passed from the accumulation of the advertisement information.

20. The system as claimed in claim 1, wherein the controller has an additional function of a timer for counting a time from the accumulation of the advertisement information to instruct the producing unit to produce the advertisement information when a predetermined time has passed from the accumulation of the advertisement information.

21. The system as claimed in claim 1, wherein the system is loaded on a vehicle.

22. The system of claim 1, wherein the program and advertisement broadcast information received by the receiving processing unit is digital, the combined output is analog, and the ad-only output is digital.

23. The system of claim 22, wherein the operator-selected advertisement information sent from the control unit to the reproducing unit is sent digitally.

24. The system of claim 1, wherein the accumulating unit is arranged as a memory stack, so that newly added said ad-only output is stored on a top of the memory stack, and oldest said ad-only output is stored at a bottom of the memory stack is disposed of if the memory stack is full when it is time to add a new said ad-only output.

* * * * *